United States Patent
Agnihotri et al.

(10) Patent No.: US 11,044,294 B2
(45) Date of Patent: Jun. 22, 2021

(54) ATSC 3.0 PLAYBACK USING MPEG MEDIA TRANSPORT PROTOCOL (MMTP)

(71) Applicant: Sony Corporation, Tokyo (JP)

(72) Inventors: Tanmay Agnihotri, San Diego, CA (US); Graham Anthony Clift, Poway, CA (US); Mimi Vu Tran, San Diego, CA (US)

(73) Assignee: Sony Group Corporation, Tokyo (JP)

(*) Notice: Subject to any disclaimer, the term of this patent is extended or adjusted under 35 U.S.C. 154(b) by 102 days.

(21) Appl. No.: 15/925,190

(22) Filed: Mar. 19, 2018

(65) Prior Publication Data
US 2019/0207998 A1    Jul. 4, 2019

Related U.S. Application Data

(60) Provisional application No. 62/613,155, filed on Jan. 3, 2018.

(51) Int. Cl.
| | |
|---|---|
| *H04N 21/2383* | (2011.01) |
| *H04N 21/438* | (2011.01) |
| *H04N 21/854* | (2011.01) |
| *H04L 29/06* | (2006.01) |
| *H04L 29/08* | (2006.01) |
| *H04N 21/845* | (2011.01) |
| *H04N 21/426* | (2011.01) |

(52) U.S. Cl.
CPC ........ *H04L 65/604* (2013.01); *H04L 65/4084* (2013.01); *H04L 67/02* (2013.01); *H04N 21/2383* (2013.01); *H04N 21/4382* (2013.01); *H04N 21/8456* (2013.01); *H04N 21/85406* (2013.01); *H04N 21/426* (2013.01)

(58) Field of Classification Search
CPC ... H04L 65/604; H04L 65/4084; H04L 67/02; H04L 67/10; H04L 65/00; H04N 21/8456; H04N 21/4382; H04N 21/2383; H04N 21/85406; H04N 5/4401
See application file for complete search history.

(56) References Cited

U.S. PATENT DOCUMENTS

| | | | |
|---|---|---|---|
| 6,005,938 | A | 12/1999 | Banker et al. |
| 6,373,904 | B1 | 4/2002 | Sakamoto et al. |
| 6,393,562 | B1 | 5/2002 | Maillard |

(Continued)

FOREIGN PATENT DOCUMENTS

| | | |
|---|---|---|
| WO | 2016140479 A1 | 9/2016 |
| WO | 2016178494 A1 | 11/2016 |

(Continued)

OTHER PUBLICATIONS

Kim et al.: Method of DASH segments into a MMTP stream for switching contents under a hybrid broadcasting environment. (Year: 2017).*

(Continued)

*Primary Examiner* — Kamal B Divecha
*Assistant Examiner* — Clifton Houston
(74) *Attorney, Agent, or Firm* — John L. Rogitz

(57) ABSTRACT

Moving Picture Experts Group (MPEG) media transport protocol (MMTP) content is received from a source of content such as an ATSC 3.0 source. The MMTP content is converted to Dynamic Adaptive Streaming over Hypertext Transfer Protocol (DASH), and the receiving media player then plays the DASH.

14 Claims, 5 Drawing Sheets

(56) References Cited

U.S. PATENT DOCUMENTS

| | | | |
|---|---|---|---|
| 6,584,199 | B1 | 6/2003 | Kim et al. |
| 6,920,222 | B1 | 7/2005 | Tsukahara et al. |
| 8,401,191 | B2 | 3/2013 | Chen et al. |
| 9,002,006 | B2 | 4/2015 | Chen et al. |
| 2005/0198680 | A1 | 9/2005 | Baran et al. |
| 2006/0004661 | A1 | 1/2006 | Bacon |
| 2006/0053442 | A1 | 3/2006 | Ridderheim et al. |
| 2007/0098165 | A1 | 5/2007 | Yoshikawa |
| 2008/0168133 | A1* | 7/2008 | Osborne .......... H04N 7/17318 709/203 |
| 2009/0136203 | A1* | 5/2009 | Van Stam .......... G11B 27/036 386/343 |
| 2009/0296535 | A1* | 12/2009 | Jones .......... H04N 5/765 369/1 |
| 2011/0142139 | A1* | 6/2011 | Cheng .......... H04N 21/4392 375/240.25 |
| 2012/0167133 | A1 | 6/2012 | Carroll et al. |
| 2012/0192220 | A1 | 7/2012 | Wyatt et al. |
| 2012/0307654 | A1* | 12/2012 | Pantos .......... H04L 47/283 370/252 |
| 2013/0007799 | A1 | 1/2013 | Sandoval |
| 2013/0326553 | A1 | 12/2013 | Nicolas |
| 2013/0332976 | A1 | 12/2013 | Shenker et al. |
| 2014/0325572 | A1* | 10/2014 | Yie .......... H04N 21/8456 725/74 |
| 2015/0100996 | A1* | 4/2015 | Freeman .......... H04N 21/8455 725/110 |
| 2015/0195327 | A1* | 7/2015 | Bouazizi .......... H04L 65/608 709/219 |
| 2015/0281799 | A1* | 10/2015 | Lim .......... H04N 21/631 725/110 |
| 2016/0234348 | A1* | 8/2016 | Mao .......... H04L 69/08 |
| 2016/0234355 | A1 | 8/2016 | Lee et al. |
| 2016/0234682 | A1 | 8/2016 | Mandyam |
| 2016/0360288 | A1 | 12/2016 | Mandyam et al. |
| 2016/0373489 | A1* | 12/2016 | Lee .......... H04N 21/2362 |
| 2017/0054520 | A1* | 2/2017 | Kwak .......... H04H 20/59 |
| 2017/0134763 | A1* | 5/2017 | Hwang .......... H04N 21/2381 |
| 2017/0374429 | A1 | 12/2017 | Yang |
| 2018/0288468 | A1 | 10/2018 | Yamagishi et al. |
| 2018/0373847 | A1 | 12/2018 | Lo et al. |
| 2019/0058909 | A1 | 2/2019 | Eyer et al. |
| 2019/0058929 | A1 | 2/2019 | Young et al. |
| 2019/0174156 | A1 | 6/2019 | Crawford et al. |
| 2019/0215575 | A1* | 7/2019 | Yang .......... H04N 21/64322 |
| 2019/0246148 | A1 | 8/2019 | Oh et al. |
| 2020/0007922 | A1 | 1/2020 | Yun |

FOREIGN PATENT DOCUMENTS

| | | |
|---|---|---|
| WO | 2016190720 A1 | 12/2016 |
| WO | 2017184648 A1 | 10/2017 |
| WO | 2018202768 A1 | 11/2018 |

OTHER PUBLICATIONS

Xu et al.: DASH and MMT and their Applications. (Year: 2016).*
"ATSC 3.0 Standards", retrieved on Feb. 16, 2018 from https://www.atsc.org/standards/atsc-3-0-standards/.
"ISO/IEC 23009-5:2017—Information technology—Dynamic adaptive streaming over HTTP (DASH)—Part 5: Server and network assisted DASH (SAND)", May 2017.
I. Bouazizi, "MPEG Media Transport Protocol (MMTP)", Samsung Research America, Mar. 4, 2014.
"ATSC Standard: ATSC 3.0 Interactive Content", Advanced Television Systems Committee, Dec. 18, 2017.
Charlemagne Aguilar Santos, Tanmay Agnihotri, "ATSC 3.0 Advertising Notification Using Event Streams", file history of related U.S. Appl. No. 16/275,078, filed Feb. 13, 2019.
"ATSCaster—ROUTE and MMTP server for ATSC 3.0", ENENSYS, Jul. 2018.
Paul Joseph Hearty, Mark Kenneth Eyer, "Delivery of Information Related to Digital Rights Management (DRM) in a Terrestrial Broadcast System", file history of related U.S. Appl. No. 16/214,933, filed Dec. 10, 2018.
Paul Joseph Hearty, Mark Eyer, "Delivery of Information Related to Digital Rights Management (DRM) in a Terrestrial Broadcast System", related U.S. Appl. No. 16/214,933, Non-Final Office Action dated Dec. 20, 2019.
Paul Joseph Hearty, Mark Eyer, "Delivery of Information Related to Digital Rights Management (DRM) in a Terrestrial Broadcast System", related U.S. Appl. No. 16/214,933, Applicant's response to Non-Final Office Action filed Dec. 24, 2019.
Tanmay Agnihotri, "Advanced Television Systems Committee (ATSC) 3.0 Latency-Free Display of Content Attribute", file history of related U.S. Appl. No. 16/710,746, filed Dec. 11, 2019.
Paul Joseph Hearty, Mark Eyer, "Delivery of Information Related to Digital Rights Management (DRM) in a Terrestrial Broadcast System", related U.S. Appl. No. 16/214,933, Final Office Action dated Mar. 27, 2020.
Paul Joseph Hearty, Mark Eyer, "Delivery of Information Related to Digital Rights Management (DRM) in a Terrestrial Broadcast System", related U.S. Appl. No. 16/214,933, Applicant's response to Final Office Action dated Apr. 3, 2020.
"RFC 4033, DNS Security Introduction and Requirements," Arends, R., Austein, R., Larson, M., Massey, D., and S. Rose, Internet Engineering Task Force, Fremont, CA, Mar. 2005.
"RFC 4055, Additional Algorithms and Identifiers for RSA Cryptography for use in the Internet X.509 Public Key Infrastructure Certificate and Certificate Revocation List (CRL) Profile," J. Schaad, B. Kaliski, R. Housley, Internet Engineering Task Force, Fremont, CA, Jun. 2005.
"ATSC Standard: ATSC 3.0 Interactive Content (A/344)", May 2, 2019.
"ATSC Standard: ATSC 3.0 Security and Service Protection", Aug. 20, 2019.
"ATSC Standard: ATSC 3.0 System", Sep. 17, 2019.
"ATSC Standard: Signaling, Delivery, Synchronization, and Error Protection (A/331)", Jun. 19, 2019.
"RFC 3279, Algorithms and Identifiers for the Internet X.509 Public Key Infrastructure Certificate and Certificate Revocation List (CRL) Profile," L. Bassham, W. Polk, R. Housley, Internet Engineering Task Force, Fremont, CA, Apr. 2002.
"RFC 5280, Internet X.509 Public Key Infrastructure Certificate and Certificate Revocation List (CRL) Profile," D. Cooper, S. Santesson, S. Farrell, S. Boeyen, R. Housley, W. Polk, Internet Engineering Task Force, Fremont, CA, May 2008.
"RFC 5289, TLS Elliptic Curve Cipher Suites with SHA-256/384 and AES Galois Counter Mode (GCM)," E. Rescorla, Internet Engineering Task Force, Fremont, CA, Aug. 2008.
"RFC 5480, Elliptic Curve Cryptography Subject Public Key Information," S. Turner, D. Brown, K. Yiu, R. Housley, T. Polk, Internet Engineering Task Force, Fremont, CA, Mar. 2009.
"RFC 5652, Cryptographic Message Syntax (CMS)," R. Housley, Internet Engineering Task Force, Fremont, CA, Sep. 2009.
"RFC 5751, Secure/Multipurpose Internet Mail Extensions (S/MIME) Version 3.Message Specification," B. Ramsdell, S. Turner, Internet Engineering Task Force, Fremont, CA, Jan. 2010.
"RFC 5753, Use of Elliptic Curve Cryptography (ECC) Algorithms in Cryptographic Message Syntax (CMS)," S. Turner, D. Brown, Internet Engineering Task Force, Fremont, CA, Jan. 2010.
"RFC 5758, Internet X.509 Public Key Infrastructure: Additional Algorithms and Identifiers for DSA and ECDSA," Q. Dang, S. Santesson, K. Moriarty, D. Brown, T. Polk, Internet Engineering Task Force, Fremont, CA, Jan. 2010.
"RFC 5940, Additional Cryptographic Message Syntax (CMS) Revocation Information Choices," S. Turner, R. Housley, Internet Engineering Task Force, Fremont, CA, Aug. 2010.
"RFC 6960, X.509 Internet Public Key Infrastructure Online Certificate Status Protocol—OCSP," S. Santesson, M. Myers, R. Ankney, A. Malpani, S. Galperin, C. Adams, Internet Engineering Task Force, Fremont, CA, Jun. 2013.
"RFC 5019, The Lightweight Online Certificate Status Protocol (OCSP) Profile for High-Volume Environments," A. Deacon, R. Hurst, Internet Engineering Task Force, Fremont, CA, Sep. 2007.

(56) References Cited

OTHER PUBLICATIONS

Aguilar Santos et al., "ATSC 3.0 Advertising Notification Using Event Streams", related U.S. Appl. No. 16/275,078, Non-Final Office Action dated Feb. 16, 2021.

Aguilar Santos et al., "ATSC 3.0 Advertising Notification Using Event Streams", related U.S. Appl. No. 16/275,078, Applicant's response to Non-Final Office Action filed Apr. 8 2021.

\* cited by examiner

ATSC 3.0 PLAYBACK USING MPEG MEDIA TRANSPORT PROTOCOL (MMTP)

FIELD

This patent application relates generally to content playback using Moving Picture Experts Group (MPEG) media transport protocol (MMTP), such as may be used in Advanced Television System Committee (ATSC) 3.0 systems.

BACKGROUND

ATSC 3.0 is an Internet Protocol (IP)-based broadcasting standard that provides end-to-end delivery of IP-based content. While MPEG Dynamic Adaptive Streaming over Hypertext Transfer Protocol (DASH) is an appropriate protocol for broadband delivery, it is less than appropriate for unidirectional end-to-end content delivery for broadcasting since Hypertext Transfer Protocol (HTTP) is a bi-directional protocol. Accordingly, ATSC 3.0 supports delivery of files containing the media segments for use by the DASH media player using Real Time Object Delivery Over Unidirectional Transport (ROUTE) protocol, an ATSC 3.0 defined protocol derived from File Delivery Over Unidirectional Transport (FLUTE) protocol defined by Internet Engineering Task Force (IETF). ATSC 3.0 also supports the delivery of media using the MMTP protocol which is a real time streaming protocol for continuous unidirectional delivery that differs from the discrete object and file delivery required by DASH and supported by ROUTE.

SUMMARY

As understood herein, the use of either DASH or MMTP for media playback means that the media processor (MP) of the media player that is to play back the broadcast media cannot advantageously be "agnostic" to the protocol it processes. Thus, multiple media players otherwise would be required absent present principles. As also understood herein, the use of the ROUTE protocol for DASH playback cannot advantageously be re-used for MMTP playback. Accordingly, the techniques described herein are provided to facilitate use of a single media player, namely, a DASH media player for MMTP playback.

While the description herein uses ATSC 3.0 as an example, it is to be understood that present principles apply to MMTP playback in general.

As set forth in detail below, present principles convert MMTP data into DASH protocol for playback. This enables the reuse of a DASH media player for MMTP playback and enables the media processor to be agnostic of the particular protocol being used for transport.

Accordingly, a media playback apparatus includes at least one computer memory that is not a transitory signal and that includes instructions executable by at least one processor to receive Moving Picture Experts Group (MPEG) media transport protocol (MMTP) content from a source of content. The instructions are executable to convert the MMTP content to Dynamic Adaptive Streaming over Hypertext Transfer Protocol (DASH), and to play the DASH using a DASH player.

The processor can be agnostic of a protocol of media played. The source of content can be an Advanced Television System Committee (ATSC) 3.0 system source.

In example implementations, the instructions may be executable to receive the MMTP content from a MMTP delivery channel, and to extract the MMTP content from user datagram protocol (UDP) data from the delivery channel. The extracted MMTP content thus establishes extracted data. The example instructions can be executable to identify a type of the extracted data, and responsive to the type not being identified as signaling data, identify whether the extracted data is media data. The example instructions may be further executable to, responsive to the type being media data, store the media data and determine whether sufficient media data along with requisite assets has been received to start playback of the media data. In this example, the instructions can be executable to, responsive to sufficient media data along with requisite assets not being received to start playback, continue to receive MMTP content from the source of content, and responsive to sufficient media data along with requisite assets being received to start playback, return an indication that playback of the media data may be commenced. Responsive to the indication, playback of the media data may be commenced. The example instruction also may be executable to, responsive to the type being identified as signaling data, identify whether the signaling data is user service description block (USDB) data or a playback asset, and responsive to identifying the signaling data as USDB data, save a component ID, role, and type indicated by the USDB data in a component data structure. Responsive to identifying the signaling data as a playback asset, a packet ID, asset ID, and associated codec of the playback asset are saved. If desired, the component data structure can include a DASH Media Presentation Description (MPD) file.

In another aspect, a method includes receiving Moving Picture Experts Group (MPEG) media transport protocol (MMTP) content from a MMTP delivery channel. The method further includes extracting the MMTP content from user datagram protocol (UDP) data from the delivery channel, with the extracted MMTP content being extracted data. The method also includes arranging the MMTP content as Dynamic Adaptive Streaming over Hypertext Transfer Protocol (DASH), and playing the DASH using a DASH player.

In another aspect, an apparatus includes at least one processor and at least one computer storage with instructions executable by the one processor to extract Moving Picture Experts Group (MPEG) media transport protocol (MMTP) content from a MMTP delivery channel to render extracted data. The instructions are executable to identify a type of the extracted data, and responsive to the type not being identified as signaling data, identify whether the extracted data is media data. The instructions are executable to, responsive to the type being media data, store the media data and determine whether sufficient media data along with requisite assets has been received to start playback of the media data.

The details of the present application, both as to its structure and operation, can best be understood in reference to the accompanying drawings, in which like reference numerals refer to like parts, and in which:

DETAILED DESCRIPTION

Figure 1:
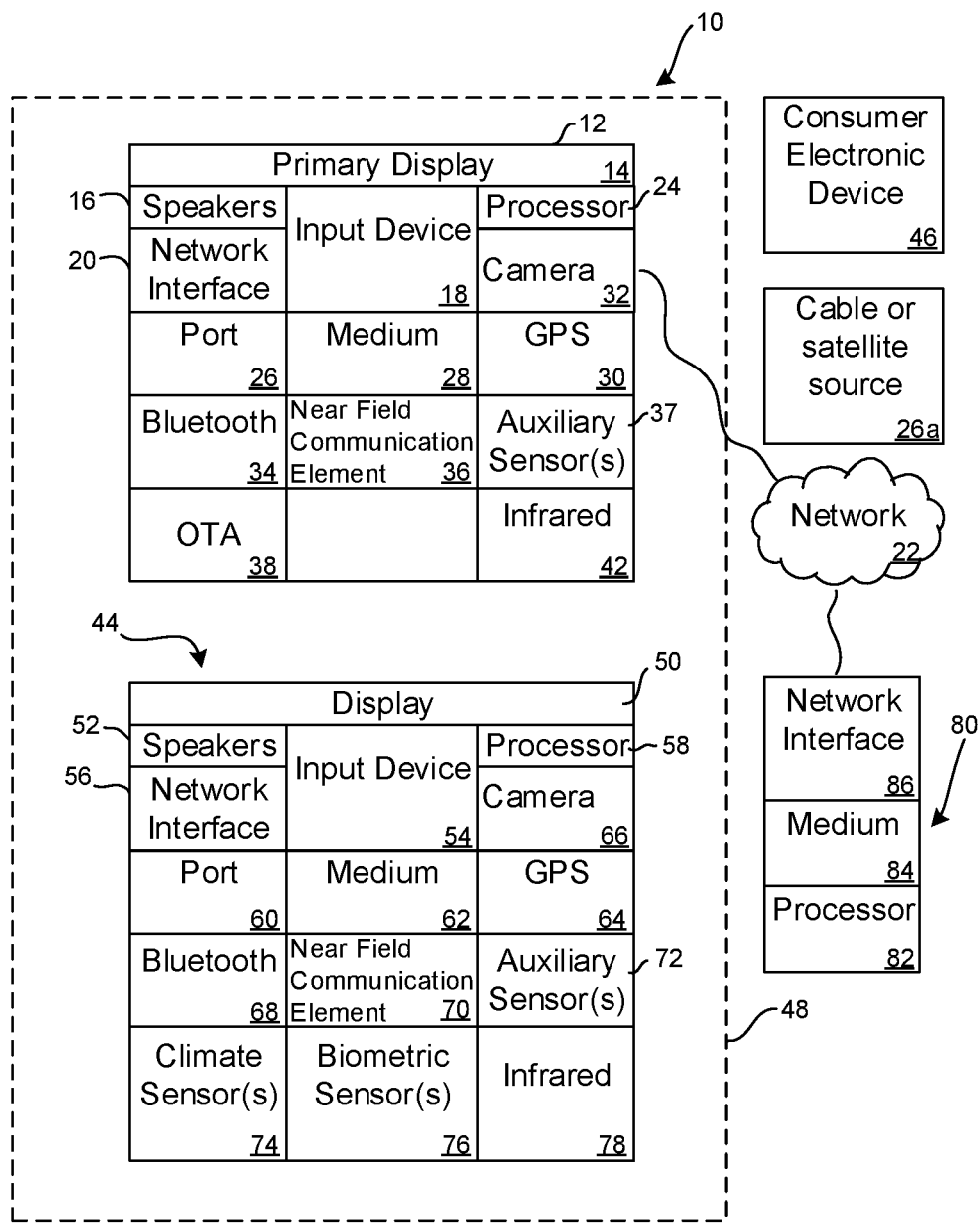
FIG. 1 is a block diagram of an example system including an example in accordance with present principles.

This disclosure relates generally to computer ecosystems including aspects of computer networks that may include consumer electronics (CE) devices. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C#or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A. B, and C together, etc.

Now specifically referring to FIG. 1, an example ecosystem 10 is shown, which may include one or more of the example devices mentioned above and described further below in accordance with present principles. The first of the example devices included in the system 10 is a consumer electronics (CE) device configured as an example primary display device, and in the embodiment shown is an audio video display device (AVDD) 12 such as but not limited to an Internet-enabled TV with a TV tuner (equivalently, set top box controlling a TV). The AVDD 12 may be an Android®-based system. The AVDD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVDD 12 and/or other computers described herein is configured to undertake present principles (e.g. communicate with other CE devices to undertake present principles, execute the logic described herein, and perform any other functions and/or operations described herein).

Accordingly, to undertake such principles the AVDD 12 can be established by some or all of the components shown in FIG. 1. For example, the AVDD 12 can include one or more displays 14 that may be implemented by a high definition or ultra-high definition "4K" or higher flat screen and that may or may not be touch-enabled for receiving user input signals via touches on the display. Present principles are particularly useful for the circumstance in which the display 14 is not touch-enabled. The AVDD 12 may include one or more speakers 16 for outputting audio in accordance with present principles, and at least one additional input device 18 such as e.g. an audio receiver/microphone for e.g. entering audible commands to the AVDD 12 to control the AVDD 12. The example AVDD 12 may also include one or more network interfaces 20 for communication over at least one network 22 such as the Internet, an WAN, an LAN, a PAN etc. under control of one or more processors 24. Thus, the interface 20 may be, without limitation, a Wi-Fi transceiver, which is an example of a wireless computer network interface, such as but not limited to a mesh network transceiver. The interface 20 may be, without limitation a Bluetooth transceiver, Zigbee transceiver, IrDA transceiver. Wireless USB transceiver, wired USB, wired LAN, Powerline or MoCA. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a high definition multimedia interface (HDMI) port or a USB port to physically connect (e.g. using a wired connection) to another CE device and/or a headphone port to connect headphones to the AVDD 12 for presentation of audio from the AVDD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignment purposes described further below.

The AVDD 12 may further include one or more computer memories 28 such as disk-based or solid-state storage that are not transitory signals, in some cases embodied in the chassis of the AVDD as standalone devices or as a personal video recording device (PVR) or video disk player either internal or external to the chassis of the AVDD for playing back AV programs or as removable memory media. Also, in some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g. determine the location of the AVDD 12 in e.g. all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 37 (e.g., a motion sensor such as an accelerometer, gyroscope, cyclometer, or a magnetic sensor, an infrared (IR) sensor for receiving IR commands from a remote control, an optical sensor, a speed and/or cadence sensor, a gesture sensor (e.g. for sensing gesture command), etc.) providing input to the processor 24. The AVDD 12 may include an over-the-air TV broadcast port 38 for receiving OTA TV broadcasts providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still referring to FIG. 1, in addition to the AVDD 12, the system 10 may include one or more other computer device types that may include some or all of the components shown for the AVDD 12. In one example, a first device 44 and a second device 46 are shown and may include similar components as some or all of the components of the AVDD 12. Fewer or greater devices may be used than shown.

In the example shown, to illustrate present principles all three devices 12, 44, 46 are assumed to be members of a local network in, e.g., a dwelling 48, illustrated by dashed lines.

The example non-limiting first device 44 may include one or more touch-sensitive surfaces 50 such as a touch-enabled video display for receiving user input signals via touches on the display. The first device 44 may include one or more speakers 52 for outputting audio in accordance with present principles, and at least one additional input device 54 such as e.g. an audio receiver/microphone for e.g. entering audible commands to the first device 44 to control the device 44. The example first device 44 may also include one or more network interfaces 56 for communication over the network 22 under control of one or more processors 58. Thus, the interface 56 may be, without limitation, a Wi-Fi transceiver, which is an example of a wireless computer network interface, including mesh network interfaces. It is to be understood that the processor 58 controls the first device 44 to undertake present principles, including the other elements of the first device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first device 44 may also include one or more input ports 60 such as, e.g., a HDMI port or a USB port to physically connect (e.g. using a wired connection) to another computer device and/or a headphone port to connect headphones to the first device 44 for presentation of audio from the first device 44 to a user through the headphones. The first device 44 may further include one or more tangible computer readable storage medium 62 such as disk-based or solid-state storage. Also in some embodiments, the first device 44 can include a position or location receiver such as but not limited to a cellphone and/or GPS receiver and/or altimeter 64 that is configured to e.g. receive geographic position information from at least one satellite and/or cell tower, using triangulation, and provide the information to the device processor 58 and/or determine an altitude at which the first device 44 is disposed in conjunction with the device processor 58. However, it is to be understood that that another suitable position receiver other than a cellphone and/or GPS receiver and/or altimeter may be used in accordance with present principles to e.g. determine the location of the first device 44 in e.g. all three dimensions.

Continuing the description of the first device 44, in some embodiments the first device 44 may include one or more cameras 66 that may be, e.g., a thermal imaging camera, a digital camera such as a webcam, etc. Also included on the first device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first device 44 may include still other sensors such as e.g. one or more climate sensors 74 (e.g. barometers, humidity sensors, wind sensors, light sensors, temperature sensors, etc.) and/or one or more biometric sensors 76 providing input to the device processor 58. In addition to the foregoing, it is noted that in some embodiments the first device 44 may also include an infrared (IR) transmitter and/or IR receiver and/or IR transceiver 42 such as an IR data association (IRDA) device. A battery may be provided for powering the first device 44. The device 44 may communicate with the AVDD 12 through any of the above-described communication modes and related components.

The second device 46 may include some or all of the components described above.

Now in reference to the afore-mentioned at least one server 80, it includes at least one server processor 82, at least one computer memory 84 such as disk-based or solid state storage, and at least one network interface 86 that, under control of the server processor 82, allows for communication with the other devices of FIG. 1 over the network 22, and indeed may facilitate communication between servers, controllers, and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

The devices described below may incorporate some or all of the elements described above.

The above methods may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the internet.

Figure 2:
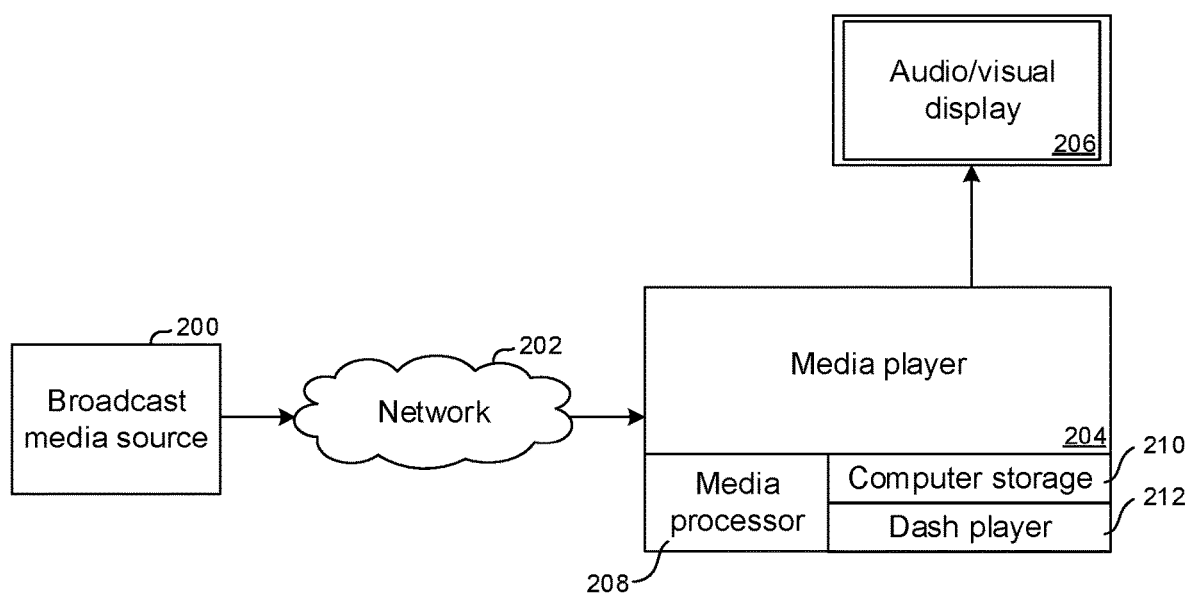
FIG. 2 is a block diagram of a specific example system consistent with present principles.

FIG. 2 illustrates an example environment in which devices that can include some or all of the components discussed above may be employed. A broadcast media source 200 may send, over a network 202, media to a media player 204 for playback of the media, typically in audio-video form on an audio and/or video display 206. The source 200 may be any suitable source such as an Internet server and the network 202 may be a combination of wired and wireless paths implemented by the Internet. The media player 204 may be implemented by any suitable device such as a mobile phone, a personal computer or other type of computer, an Internet-enabled TV, etc. The media player 204 may include one or more media processors 208 accessing one or more computer storages 210 that may contain media playing software such as a DASH player 212.

Figure 3:
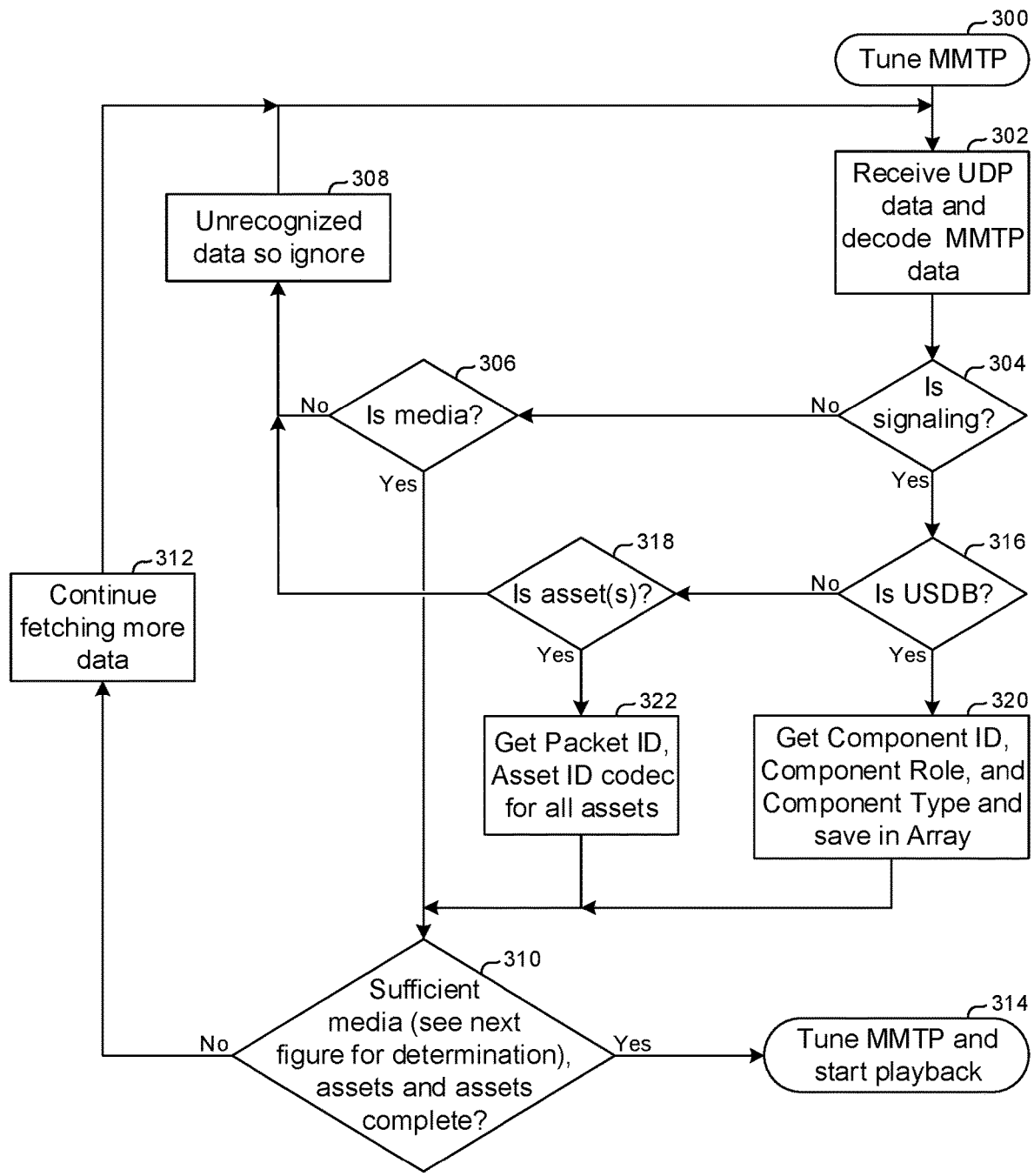
FIG. 3 is a flow chart of example MMTP-to-DASH translation logic consistent with present principles.

FIG. 3 illustrates example logic consistent with present principles that may be employed by, e.g., the media player 204 in FIG. 3. Commencing at block 300, a MMTP delivery channel is tuned to. Proceeding to block 302, user datagram protocol (UDP) data from the tuned-to channel is received and the MMTP data is extracted from the transport layer (UDP messages).

Decision diamond 304 indicates that the type of the extracted data is identified, and if the type of data is not identified by the receiver as signaling data, the logic can move to decision diamond 306 to identify whether the data is media data. Note that signaling data typically provides information for discovery and acquisition of services and related content components, and thus on this basis may be distinguished from the media data itself. If the data is not media, the data is unrecognized at state 308 and ignored, and the process loops back to block 302.

However, if the type of data is media data, the logic stores the media data and moves to decision diamond 310 to determine whether sufficient media along with requisite assets (such as an appropriate codec) has been received to start playback of the media, as discussed further below in reference to FIG. 4. Once requisite assets have been received a DASH Media Presentation Description (MPD) file is created based on the information received in the Assets and USDB.

If sufficient media has not been received to start playback, or if the requisite attendant assets to play the media are not found, the logic continues to fetch more data at state 312 by looping back to block 302. On the other hand, when it is determined at decision diamond 310 that sufficient media exists to start playback and that the needed assets are available, the logic moves to block 314 to tune to the MMTP channel and indicate that MMTP acquisition is complete, and to start playback of the media using the DASH player 212 or to indicate as by a message presented on the display of the device that playback may be commenced.

Returning to decision diamond 304, if it is determined that data being received is identified as signaling, the logic may move to decision diamond 316 to identify whether the data is user service description block (USDB) data. If not, the logic may move to decision diamond 318 to determine whether the data indicates an asset that is within a set of known or expected assets. If the data is neither USDB nor an asset the data is unrecognized and so the process loops back to block 302.

However, if the data is recognized at decision diamond 316 as being USDB, the logic moves to block 320 to obtain from the data the component ID, role, and type indicated by the USDB data are identified and saved in a component array. If the data is recognized as asset data at decision diamond 318, the logic moves to block 322 to obtain, from the data, the packet ID, asset ID, and associated codec of the assets identified in diamond 318. These data components are identified and saved. From block 320 or 322 the logic proceeds to decision diamond 310, described above.

If desired, the logic may determine whether the count of all assets equals a predefined or known component array size.

Figure 4:
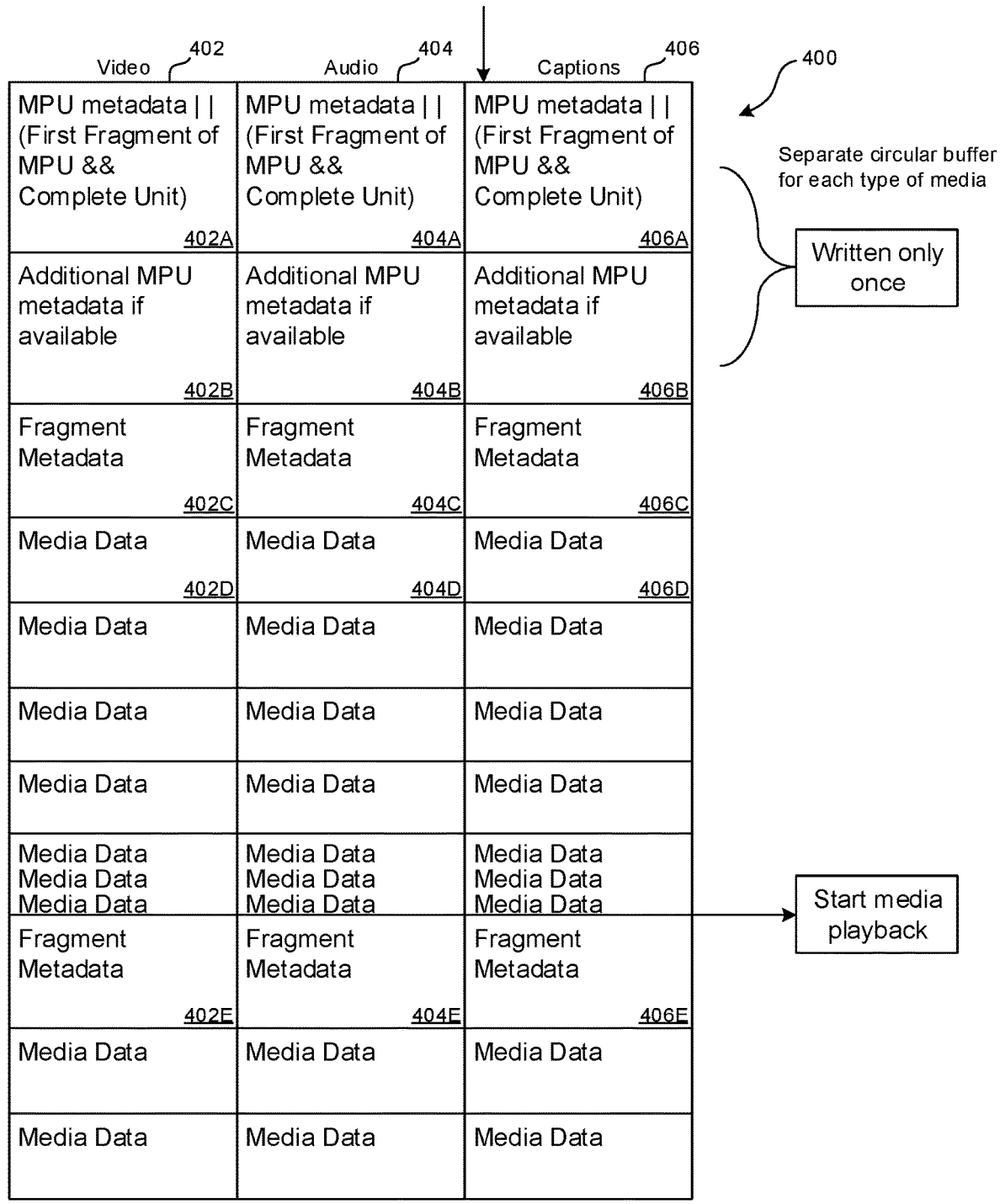
FIG. 4 is a schematic diagram of example data structures implemented as circular buffers for each type of media to be played back (e.g., video, audio, and captions)

FIG. 4 schematically illustrates a data structure 400 in which media data converted from MMTP to DASH may be stored. It is to be understood that accompanying assets such as codecs received in FIG. 3 may be stored and linked to the media data.

Video data may be stored in a video circular buffer represented by the column 402, audio data may be stored in an audio circular buffer represented by the column 404, and caption (text) data may be stored in a caption circular buffer represented by the column 406. Each of the separate circular buffers may contain a respective initial block 402A, 404A, 406A of MPU metadata, including the first fragment of MPU data plus a complete unit of such data, followed by any additional MPU metadata 402B, 404B, 406B if available. This data typically is written only once to the data structure.

Following the metadata, fragment metadata 402C, 404C, and 406C may be provided, following which are blocks 402D, 404D, and 406D of media (video, audio, and caption) in each respective circular buffer). For subsequent fragments in the buffer, fragment metadata 402E, 404E, 406E may be recorded followed by associated media data as shown. Media playback on a fragment-by-fragment basis typically is commenced upon encountering the associated metadata.

With the above in mind, it may now be appreciated that the determination of whether sufficient assets and media exists for playback at decision diamond 308 in FIG. 3 may access the data structure in FIG. 4 to determine wither sufficient media fragments and ensuing media blocks exist to commence playback. In making this determination, a threshold amount of media data may be used to compare with existing stored data exceeds the threshold and if so, a positive determination can be returned at decision diamond 308.

Figure 5:
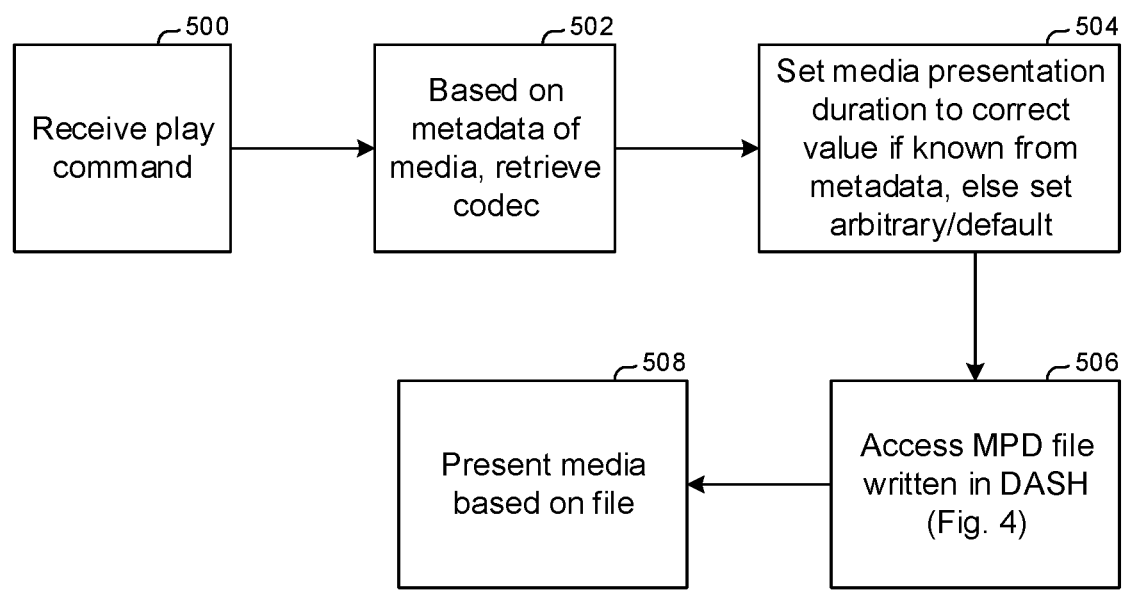
FIG. 5 is a flow chart of example media play logic consistent with present principles.

FIG. 5 illustrates additional example logic. Commencing at block 500, a play command is received, e.g., by a user selecting a play selector or speaking "play". Moving to block 502, the data structure of FIG. 4 may be accessed to retrieve the appropriate codec for the demanded media based on the codec indicated in the associated metadata.

Proceeding to block 504, the duration for media presentation may be set to the correct value if known (e.g., from the metadata) or to an arbitrary default period. The media data in DASH format is accessed at block 506 from the data structure of FIG. 4 and presented at block 508.

It will be appreciated that whilst present principals have been described with reference to some example embodiments, these are not intended to be limiting, and that various alternative arrangements may be used to implement the subject matter claimed herein.

What is claimed is:

1. A media playback apparatus comprising:
   at least one computer memory storing instructions executable by at least one processor;
   the at least one processor programmed with the instructions to:
   receive Moving Picture Experts Group (MPEG) media transport protocol (MMTP) content from a source of content via a MMTP delivers channel;
   extract the MMTP content from user datagram protocol (UDP) data from the MMTP delivery channel, the extracted MMTP content comprising extracted data;
   identify a type of the extracted data;
   responsive to the type being identified as signaling data, identify whether the signaling data is user service, description block (USDB) data or a playback asset;
   responsive to identifying the signaling data as USDB data, save a component ID, role, and type indicated by the USDB data in a component data structure; and
   responsive to identifying the signaling data as a playback asset, save a packet ID, asset ID, and associated codec of the playback asset;
   convert the MMTP content to Dynamic Adaptive Streaming over Hypertext Transfer Protocol (DASH) content; and
   play the DASH content using a DASH player, wherein the MMTP content is converted to the DASH content by rearranging the MMTP content into a data structure comprising:
   video data stored in a video buffer;
   audio data stored in an audio buffer;
   text data stored in a text buffer,
   each of the buffers comprising a respective initial block of media processing unit (MPU) metadata, including the first fragment of MPU data plus a complete unit of such data, followed by any additional MPU metadata, and following the metadata, fragment metadata following which are blocks of media in each respective buffer, wherein media playback on a fragment-by-fragment basis is commenced upon encountering associated metadata.

2. The media playback apparatus of claim 1, wherein the at least one processor is agnostic of a protocol of media played by the at least one processor.

3. The media playback apparatus of claim 1, wherein the source of content comprises an Advanced Television System Committee (ATSC) 3.0 system source.

4. The media playback apparatus of claim 1, wherein the instructions are executable to:
   responsive to the type not being identified as signaling data, identify whether the extracted data is media data; and
   responsive to the type being media data, store the media data and determine whether sufficient media data along with requisite assets has been received to start playback of the media data.

5. The media playback apparatus of claim 4, wherein the instructions are executable to:
   responsive to sufficient media data along with requisite assets not being received to start playback, continue to receive the MMTP content from the source of content;
   responsive to sufficient media data along with requisite assets being received to start playback, return an indication that playback of the media data may be commenced.

6. The media playback apparatus of claim 5, wherein the instructions are executable to, responsive to the indication, commence playback of the media data.

7. The media playback apparatus of claim 1, wherein the component data structure comprises a DASH Media Presentation Description (MPD) file.

8. A method comprising:
   receiving Moving Picture Experts Group (MPEG) media transport protocol (MMTP) content from a source of content via a MMTP delivery channel;
   extracting the MMTP content from user datagram protocol (UDP) data from the MMTP delivery channel, the extracted MMTP content comprising extracted data;
   arranging the MMTP content as Dynamic Adaptive Streaming over Hypertext Transfer Protocol (DASH) content;
   playing the DASH content using a DASH player, wherein the method comprises:
   identifying a type of the extracted data;
   responsive to the type not being identified as signaling data, identifying whether the extracted data is media data;
   responsive to the type being media data, storing the media data and determining whether sufficient media data along with requisite assets has been received to start playback of the media data;
responsive to the type being identified as signaling data, identifying whether the signaling data is user service description block (USDB) data or a playback asset;
responsive to identifying the signaling data as USDB data, saving a component ID, role, and type indicated by the USDB data in a component data structure; and
responsive to identifying the signaling data as a playback asset, saving a packet ID, asset ID, and associated codec of the playback asset,
wherein the MMTP content is converted to the DASH content by rearranging the MMTP content into a data structure comprising:
video data stored in a video buffer;
audio data stored in an audio buffer:
text data stored in a text buffer,
each of the buffers comprising a respective initial block of media processing unit (MPU) metadata, including the first fragment of MPU data plus a complete unit of such data, followed by any additional MPU metadata, and following the metadata, fragment metadata following which are blocks of media in each respective buffer, wherein media playback on a fragment-by-fragment basis is commenced upon encountering associated metadata.

9. The method of claim 8, comprising:
responsive to sufficient media data along with requisite assets not being received to start playback, continuing to receive the MMTP content from the source of content;
responsive to sufficient media data along with requisite assets being received to start playback, returning an indication that playback of the media data may be commenced.

10. The method of claim 9, comprising, responsive to the indication, commencing playback of the media data.

11. The method of claim 8, wherein the component data structure comprises a DASH Media Presentation Description (MPD) file.

12. An apparatus comprising:
at least one computer memory storing instructions executable by at least one processor;
the at least ono processor programmed with the instructions to:
extract Moving Picture Experts Group (MPEG) media transport protocol (MMTP) content from a source of content via a MMTP delivery channel to render extracted data;
identify a type of the extracted data;
responsive to the type being identified as signaling data, identify whether the signaling data is user service description block (USDB) data or a playback asset;
responsive to identifying the signaling data as USDB data, save a component ID, role, and type indicated by the USDB data in a component data structure;
responsive to identifying the signaling data as a playback asset, save a packet ID, asset ID, and associated codec of the playback asset;
arrange the extracted data from the MMTP content in a Dynamic Adaptive Streaming over Hypertext Transfer Protocol (DASH) media presentation description (MPD) such that the DASH MPD is constructed from the MMTP content; and
play DASH content in accordance with the DASH MPD, wherein the MMTP content is converted to the DASH content by rearranging the MMTP content into a data structure comprising:
video data stored in a video buffer:
audio data stored in an audio buffer:
text data stored in a text buffer,
each of the buffers comprising a respective initial block of media processing unit (MPU) metadata, including the first fragment of MPU data plus a complete unit of such data, followed by any additional MPU metadata, and following the metadata, fragment metadata following which are blocks of media in each respective buffer, wherein media playback on a fragment-by-fragment basis is commenced upon encountering associated metadata.

13. The apparatus of claim 12, wherein the instructions are executable to:
responsive to the type not being identified as signaling data, identify whether the extracted data is media data; and
responsive to the type being media data, store the media data.

14. The apparatus of claim 13, wherein the instructions are executable to:
responsive to sufficient media data along with requisite assets not being received to start playback, continue to receive the MMTP content from the source of content;
responsive to sufficient media data along with requisite assets being received to start playback, return an indication that playback of the media data may be commenced.

* * * * *